Patented Apr. 1, 1941

2,236,988

UNITED STATES PATENT OFFICE 2,236,988

CELLULAR CONCRETE

Ira C. Bechtold and John E. McKinney, Colton, Calif., assignors to California Portland Cement Company, Los Angeles, Calif., a corporation of California No Drawing. Application February 20, 1939, Serial No. 257,334

11 Claims. (Cl. 25—155)

This invention relates generally to improvements in methods for producing light weight or porous concrete and has for its primary object to provide a process whereby light weight concretes may be produced having unusually low effective specific gravities and high porosity.

Light weight concrete products such as blocks, sheets, bricks, moldings, decorative cornices and other structural shapes are desirable for use in partition walls or for finishing interior walls of structures where it is desired to reduce the total load on a given section of the structure and still maintain dimensional and architectural effects corresponding to ordinary concrete designs. In addition, such light weight or porous concrete has highly desirable properties with respect to acoustic effects and sound absorption as well as to serve as heat insulation between adjacent rooms or between rooms and their exterior walls.

Heretofore light weight or porous concrete has been obtained by various methods which are basically characterized by their provision for incorporating gas bubbles in a slurry or plastic mass of a cementitious material or mixture of cementitious material and aggregates, and maintaining these gas bubbles in suspension until the cementitious material hardens and retains the bubbles as pores in the hardened mass. For example, such metals as aluminum, magnesium, zinc, etc., capable of reacting with bases to release hydrogen gas, have been added to basic cementitious materials with the object of producing the pores as residual casts of the bubbles produced by evolution of hydrogen. Other processes have relied upon the addition of foam producing agents and sometimes with the additional step of introducing air into the plastic mass to provide the desired bubbles. Such mixtures as one of glue, water and formalin have been proposed. Another method has been based upon the release of carbon dioxide gas within the plastic mass. Still another process has been dependent upon freeing oxygen gas from hydrogen peroxide within the plastic mass. All of these processes are characterized by a certain lack of control over the amount of gas produced, the distribution of the gas throughout the plastic mass, and the ultimate size of the gas formed voids in the hardened mass. Furthermore, some of these methods involve the use of expensive materials which results in a cost that is too great to allow the use of the product in most structures. Another difficulty is that some of the proposed additive materials have an adverse effect upon the strength and other properties of certain cementitious materials. An example of this is the marked adverse effect of certain metals upon the strength and setting properties of Portland cements.

In the present process we have provided means for attaining the desired result of uniformly distributing air bubbles of predetermined or controllable size, throughout a plastic mass and allowing the mass to harden to produce a light weight product without the difficulties which attend other processes. The process of this invention involves only the use of readily available and inexpensive materials and equipment. It is characterized by the following features of principal importance:

a. Initial incorporation of the air in the cement or concrete in a state of minute and stable distribution throughout the mass, such that the air particles are properly and most effectively conditioned for volume variation, and b. Controlled variation of the size of the air particles to predetermine the ultimate pore size and specific gravity of the mass.

Preferably the air is introduced into the plastic mass as extremely small and uniformly distributed air bubbles or films which are stabilized by the presence of a substance suitable for maintaining the gas-liquid interface for long periods of time. Following the mixing of the cement slurry or concrete with the air thus distributed, the air bubbles and films are expanded to attain a size suitable to define the pore space to be desired in the light weight concrete product. In this manner small gas bubbles or films are very uniformly distributed in the plastic mass when it is formed by mixing the dry cement powder with water. The initial small size and high stability of these gas particles greatly facilitate their uniform distribution as contrasted with the production of a foam where the bubbles are initially large and tend to segregate and coalesce with consequent loss of control of their size and manner of distribution. The subsequent controlled enlargement of the gas particles produces the desired size of pore space so that after the cementitious mass is allowed to set and at least partially harden at an elevated temperature or decreased pressure, the pore spaces are permanently formed as defined by the size of the expanded bubbles or films. From this time on the mass may either be cured under the existing temperature or pressure conditions, or transferred to another environment for more ideal hardening conditions.

In carrying out the invention, we utilize a cement that is adapted to aeration preferably by having incorporated in it a substance capable of functioning as what may be termed an air stabilizing medium, having the property of causing minute air films or bubbles to remain in a state of uniform distribution within a cementitious mass, either in a state of adherence to the cement particles, or dispersion between them, or under both conditions. By thus employing an air stabilizing medium, it is possible to incorporate artificially in the cement an amount of air substantially in excess of the quantity of air that normally would be contained in the dry cement, or put into a wet cementitious mass as an incident of the usual operations of mixing water and cement, and also to maintain desirably small particles of the air in a more stable and uniform state of distribution throughout the mass than is possible by any of the customary methods referred to hereinabove. It will be understood that we may use a cement admixed or interground with any suitable substance possessing the desired air stabilizing properties. Preferably and typically, we may use a cement which is itself the subject matter of a copending application Serial No. 251,046, filed January 14, 1939 by Ira C. Bechtold and Harry E. Kaiser on Portland cements.

In accordance with the invention disclosed in that application, the cement is suitably admixed or interground with a filming material which adheres to the cement particles, and retains minute air films directly against the particles, or against the filming material. Thus the filming material causes air to be adsorbed or retained by the cement particles while in normal or dry condition. In this manner, it is possible to retain in the cement an amount of air such that when the cement is made into a wet mixture, the specific gravity of the latter will be considerably below the specific gravity of a corresponding mixture containing ordinary Portland cement. A gasoline-insoluble wood resin, commercially known under the trade name "Vinsol", has been found to be particularly effective as an air stabilizing medium and may be regarded as preferred. This gasoline-insoluble resin, hereinafter referred to simply as "the resin", may be produced by extracting resinous pine wood with a coal tar hydrocarbon, removing the hydrocarbon by evaporation, leaving a residue comprising a mixture of wood rosin and the gasoline-insoluble resin. The latter then is separated from the wood rosin by extracting the rosin with a suitable petroleum hydrocarbon in which the wood rosin is soluble.

As indicated, the resin may be incorporated in the cement by intergrinding, that is, by grinding the cement or cement clinker with a small percentage of the resin added, or by intimately admixing the cement and resin by any suitable method. The resin may be incorporated in the cement in an amount determinable in accordance with the properties desired in the cementitious mixture to be produced. This amount may range within percentages up to around 0.5%, or above, by weight of the finished cement. Smaller amounts of the resin will result in increased specific gravity and somewhat reduced mobility of the wet plastic cement mass. The fineness to which the cement is ground may be that which is common for ordinary Portland cements, or it may be somewhat higher. Depending upon the purposes for which the cement is to be used and the properties desired in the cement or concrete mixture, the cement fineness may range from a specific surface of 1500 to as high as 2200 square centimeters per gram.

The air thus caused by the stabilizing medium to be retained in a water-cement slurry or other mixture containing this cement, appears to be adsorbed or held to the surfaces of the individual cement particles. This adsorbed air is not present as large bubbles or in a condition such as to cause the wet mix to exhibit foaming or frothing tendencies, but is present as minute films distributed uniformly throughout the mass on the cement particles. There may be, however, in addition to the air films adhering directly to the cement particles, more air incorporated in the mass in the form of small air particles or bubbles between the cement particles and held or stabilized within the slurry by reason of the attraction for air, or air stabilizing effect, exhibited by the resin.

The aerated plastic cement now is treated or exposed to conditions whereby it is possible to vary and yet control the size of the air particles, and to maintain that control until the mass is hardened at least sufficiently to permanently form pore casts corresponding to the adjusted or predetermined air particle size. Controlled regulation of the air particles and pore size by variation of the volumes of the individual air particles in the wet or plastic mass, may be accomplished by subjecting the plastic mass to controlled temperatures or pressures, or both. By elevating the temperature of the mass, the air particles may be expanded to give the material greatly increased porosity and reduced specific gravity. A similar effect may be obtained by reducing the pressure on the mass. In general it is preferred to control the porosity by temperature variation, since this method lends itself to simple regulation without any special equipment other than suitable heating means. Using either method, after adjustment of the air particle volumes, the mass is allowed to harden while the air particle size remains under control so that corresponding pore sizes are assured in the final product.

To give an example, in preparing a molded concrete or other cementitious object, the cement is mixed with water in suitable proportion to produce a slurry of desired consistency. This slurry is placed in molds or forms of the size and shape to mold any desirable article or shape. The mold and its contents are then heated to an elevated temperature in a suitable closure and the contents are allowed to set and partially harden after which time the pore spaces are established and the shape has become rigid enough for removal from the molds. The molded shapes may then be stored at the elevated temperature or may be removed to a lower temperature for curing. The latter procedure is desirable particularly when the temperature for expansion is relatively high. The molds are made to contain an initial volume of slurry such that after expansion has occurred, the mold will be filled but not overflowing. The maximum temperature attained in producing the expansion determines the size to which the bubbles are enlarged and variation of this factor allows control to be exercised over the pore space size finally produced in concrete. It may be mentioned that cementitious mixtures of the present type possess, by virtue of the quantity and state of distribution of their air content, exceptional plasticity and workability which facilitate molding and shaping the mass accurately to any desired configuration.

An ordinary Portland cement that had been interground with about 0.50% by weight of the resin, was made into a slurry having a water-cement ratio of 0.50 by weight, and the slurry was placed in molds which were subsequently immersed in a water bath. When the water bath was maintained at 150° F. while the cement set, a product was obtained which had an effective specific gravity of about 1.27 or substantially 80 pounds per cubic foot. When the storage temperature was 200° F. instead of 150° F. the resulting product had an effective specific gravity of less than 1.00 or less than 62.5 pounds per cubic foot.

Thus it is seen that concrete of unusually low specific gravity may be made by this process. Other temperatures may be used to vary the pore space dimensions, and hence the specific gravity, as may be desired and within substantial limits. The example cited indicates one means of applying the necessary heat to produce expansion but this is not to be understood to be the only applicable method. It will be readily apparent that any suitable heat transfer device will serve the purpose such as immersion in heated air, the use of jacketed molding or forming equipment, the application of steam or electric heat, etc. We prefer to carry out the heating process under conditions where the initial water of mixing the slurry is not lost and preferably under conditions where excess water or water vapor is supplied to the setting mass. In most cases, enclosed molds or forms are desirable so that the expanding mass may form itself against the mold under its own pressure and, being confined, the mass forms itself neatly on all sides against the walls of the mold. Because of this effect this process lends itself to special use in molding such articles as intricate decorative shapes where the ability to expand against the mold enhances the sharpness of detail and fidelity of reproduction of the design of the mold.

As will be understood, where the plastic objects to be formed are subjected to controlled pressure, or combined controlled pressure and temperature, the objects may be placed in a suitable closure or container within which the pressure (and temperature if desired) may be controlled to regulate the air particle size, the objects remaining under the controlled conditions until their pore spaces are permanently established. Pressure may be applied to the objects by any suitable fluid, gas or liquid, and in the presence of excess moisture when desired.

We may incorporate aggregates in the plastic material for purposes of enhancing its physical properties or for decorative purposes, by mixing suitable sands or gravels with the cement-water mixture. The so-called "light weight" aggregates such as low density or porous clays, slags, as well as many other commonly known types of such aggregates, are particularly well suited to this process and may be used to advantage when necessary. Decorative effects may be produced in the product by incorporating decorative aggregates or colored materials as distinct colored particles or as integral coloring for the cement paste.

It is to be understood that the invention contemplates generally the formation of Portland cement bodies whether merely cement and water mixtures or mixtures of the cement with aggregate or other admixtures, and that the expression "water-Portland cement mass" as used in the claims is to be interpreted accordingly.

We claim:

1. The process of making porous cementitious bodies that includes, mixing water with a finely ground cementitious material comprising particles coated with a stabilizing substance causing air particles to be adsorbed by said particles of the material while in dry condition, thereby forming a plastic mass having said air particles uniformly distributed therein, controllably varying the volume of said air particles to predetermine the porosity and final specific gravity of the mass, and allowing the mass to harden to permanently define the interstitial spaces formed by the air particles while their volume is so controlled.

2. The process of making porous cementitious bodies that includes, mixing water with a finely ground cementitious material comprising particles coated with a resin as herein defined which causes air particles to be adsorbed by said particles of the material while in dry condition, thereby forming a plastic mass having said air particles uniformly distributed therein, controllably varying the volume of said air particles to predetermine the porosity and final specific gravity of the mass, and allowing the mass to harden to permanently define the interstitial spaces formed by the air particles while their volume is so controlled.

3. The process of forming cement or concrete articles of unusually low specific gravity that includes, forming a plastic water-Portland cement mass having minute air particles artificially held directly to the individual cement particles by a stabilizing substance causing air to be adsorbed by said particles in dry condition, controllably varying the volume of said air particles to predetermine the porosity and final specific gravity of the mass, and allowing the mass to harden to permanently define the interstitial spaces formed by the air particles while their volume is so controlled.

4. The process of forming cement or concrete articles of unusually low specific gravity that includes, forming a plastic water-Portland cement mass containing a stabilizing substance uniformly distributed throughout the cement, said substance coating the cement particles and holding minute air particles thereto, controllably varying the volume of said air particles to predetermine the porosity and final specific gravity of the mass, and allowing the mass to harden to permanently define the interstitial spaces formed by the air particles while their volume is so controlled.

5. The process of forming cement or concrete particles of unusually low specific gravity that includes, forming a plastic water-Portland cement mass having minute air particles artificially held therein by a resin as herein defined, said resin coating the cement particles and causing minute air particles to be adsorbed by the cement particles while in dry condition, controllably varying the volume of said air particles to predetermine the porosity and final specific gravity of the mass, and allowing the mass to harden to permanently define the interstitial spaces formed by the air particles while their volume is so controlled.

6. The process of forming cement or concrete articles of unusually low specific gravity that includes, forming a plastic water-Portland cement mass having minute air particles artificially held directly to the individual cement particles by a resin as herein defined, said resin coating the cement particles and causing minute air particles to be adsorbed by the cement particles while in dry condition, subjecting said mass to elevated temperatures whereby said air particles are expanded and allowing the mass to harden to permanently define the interstitial spaces formed by the expanded air particles.

7. The process of forming cement or concrete articles of unusually low specific gravity that includes, forming a plastic water-Portland cement mass containing a stabilizing substance coating the cement particles and holding minute air particles thereto, subjecting said mass to elevated temperature whereby said air particles are expanded and allowing the mass to harden to permanently define the interstitial spaces formed by the expanded air particles.

8. The process of treating a cementitious mass containing minute air particles held to the individual cement particles by a stabilizing medium causing air to be adsorbed on the cement particles, that includes controllably varying the volume of said particles to form pore spaces of enlarged size, and then permitting said mass to harden while the pore spaces are so enlarged.

9. The process of treating a cementitious mass containing minute air particles held to the individual cement particles by a resin as herein defined, said resin coating the cement particles and causing minute air particles to be adsorbed by the cement particles while in dry condition, that includes controllably heating said mass and thereby controllably varying the volume of said particles to form pore spaces of enlarged size, and then permitting said mass to harden while the pore spaces are so enlarged.

10. The process of treating a cementitious mass containing a stabilizing substance coating the cement particles and causing them to adsorb minute air particles uniformly distributed within the mass, that includes controllably varying the volume of said particles to predetermine the porosity and final specific gravity of the mass, and allowing the mass to harden while the air particles volume is so controlled.

11. The process that includes, making a finely ground cementitious material comprising particles coated with a stabilizing substance causing air particles to be adsorbed by said particles of the material while in dry condition, mixing said material with water to form a plastic mass having said air particles uniformly distributed therein, controllably varying the volume of said air particles to predetermine the porosity and final specific gravity of the mass, and allowing the mass to harden to permanently define the interstitial spaces formed by the air particles while their volume is so controlled.

IRA C. BECHTOLD.
JOHN E. McKINNEY.

CERTIFICATE OF CORRECTION.

Patent No. 2,236,988. April 1, 1941.

IRA C. BECHTOLD, ET AL.

It is hereby certified that error appears in the printed specification of the above numbered patent requiring correction as follows: Page 3, second column, line 17, claim 2, for "absorbed" read --adsorbed--; line 53, claim 5, for the word "particles" read --articles--; and that the said Letters Patent should be read with this correction therein that the same may conform to the record of the case in the Patent Office.

Signed and sealed this 6th day of May, A. D. 1941.

(Seal)

Henry Van Arsdale,
Acting Commissioner of Patents.